(12) United States Patent
Ritter

(10) Patent No.: US 11,645,606 B2
(45) Date of Patent: May 9, 2023

(54) TEAR AWAY QUILTING TEMPLATE

(71) Applicant: Patricia Ritter, New Braunfels, TX (US)

(72) Inventor: Patricia Ritter, New Braunfels, TX (US)

( * ) Notice: Subject to any disclaimer, the term of this patent is extended or adjusted under 35 U.S.C. 154(b) by 296 days.

(21) Appl. No.: 17/203,843

(22) Filed: Mar. 17, 2021

(65) Prior Publication Data
US 2021/0241223 A1 Aug. 5, 2021

Related U.S. Application Data

(62) Division of application No. 16/178,285, filed on Nov. 1, 2018, now Pat. No. 10,975,506.

(60) Provisional application No. 62/580,441, filed on Nov. 1, 2017.

(51) Int. Cl.
| | |
|---|---|
| *B43L 13/20* | (2006.01) |
| *G06Q 10/0832* | (2023.01) |
| *H04W 4/029* | (2018.01) |
| *G06Q 10/0834* | (2023.01) |
| *D05B 97/00* | (2006.01) |
| *D05B 97/12* | (2006.01) |
| *A41H 3/06* | (2006.01) |

(52) U.S. Cl.
CPC ........... *G06Q 10/0832* (2013.01); *A41H 3/06* (2013.01); *B43L 13/20* (2013.01); *B43L 13/205* (2013.01); *D05B 97/00* (2013.01); *D05B 97/12* (2013.01); *G06Q 10/0834* (2013.01); *H04W 4/029* (2018.02)

(58) Field of Classification Search
CPC .. G06Q 10/0832; G06Q 10/0834; A41H 3/06; B43L 13/20; B43L 13/205; D05B 97/00; D05B 97/12; H04W 4/029
See application file for complete search history.

(56) References Cited

U.S. PATENT DOCUMENTS

| | | | | |
|---|---|---|---|---|
| 5,749,149 A | * | 5/1998 | Claytor | B26B 29/06 33/1 G |
| 10,975,506 B2 | * | 4/2021 | Ritter | A41H 3/06 |
| 11,142,866 B2 | * | 10/2021 | Rieger | B43L 7/033 |
| 2014/0283722 A1 | * | 9/2014 | Pinoli | D05B 97/12 112/117 |
| 2018/0177256 A1 | * | 6/2018 | Feliu De La Pena Calvo | D03D 3/00 |
| 2018/0298537 A1 | * | 10/2018 | Kennedy | D05B 11/00 |
| 2019/0127898 A1 | * | 5/2019 | Ritter | D05B 97/12 |
| 2021/0241223 A1 | * | 8/2021 | Ritter | G06Q 10/0832 |

* cited by examiner

*Primary Examiner* — Yaritza Guadalupe-McCall
(74) *Attorney, Agent, or Firm* — John C. Cave; Gunn Lee & Cave PC

(57) ABSTRACT

The present invention teaches a tear away quilting template system comprising a row template and at least one corner template. The row template and at least one corner template each feature a solid line pattern and a dashed line pattern. The dashed line pattern is designed to match and correspond with portions of the solid line pattern.

11 Claims, 16 Drawing Sheets

TEAR AWAY QUILTING TEMPLATE

CROSS REFERENCES TO RELATED APPLICATIONS

This divisional application claims the benefit of U.S. patent application Ser. No. 16/178,285 filed Nov. 1, 2018 entitled Tear Away Quilting Template which claims the benefit of Provisional Patent Application No. 62/580,441 The contents of the application are incorporated by reference herein.

FEDERALLY SPONSER RESEARCH

Not applicable.

BACKGROUND OF THE INVENTION

1. Field of the Invention

The present invention relates to tear away quilting template for use in borders and allover quilting. Specifically, the present invention teaches the use of dashed indicia for aligning the templates.

2. Description of the Related Art

Quilts are generally composed of the three layers, a decorative top layer, a filling, and a bottom layer that may or may not be decorative. Quilting is the process in which all three layers are combined using stitches. The quilting process may be done by hand but is often done using a machine such as consumer sewing machine or a commercial long arm machine. Generally any type of stitching may be used in quilting but decorative stitching provides an added level of detail. Quilting templates are routinely used to assist this process.

The variability of quilt sizes makes it impractical for a singular quilting template to be commercially sold. As a result, most quilting templates are sold as individual block or row patterns which require the user to combine the various blocks and rows depending on the dimensions of the quilt. Combining the quilting templates is difficult as the patterns make it difficult to readily ascertain how to join the various blocks and rows to make a uniform and interconnected pattern.

SUMMARY OF THE INVENTION

The present invention teaches a tear away quilting template system comprising a row template and at least one corner template. The row template and at least one corner template each feature a solid line pattern and a dashed line pattern. The dashed line pattern is designed to match and correspond with portions of the solid line pattern. The corresponding nature of the dashed line pattern permits the row template to easily match and align with another row template and a corner template. This permits the interchangeability of templates to create a border stitch pattern, create an allover uniform stitch pattern, or a combination of both. The present invention provides a system of templates that can fit virtually every dimension of a quilt.

These and further features and advantages of the present invention will become apparent from the following detailed description, wherein reference is made to the figures in the accompanying drawings.

BRIEF DESCRIPTION OF THE DRAWINGS

FIG. 8 is a top view of a first embodiment of a corner template linked with a first and second row template.

BRIEF DESCRIPTION OF THE DRAWINGS FOR THE FIRST EMBODIMENT

First Embodiment

Figure 1:
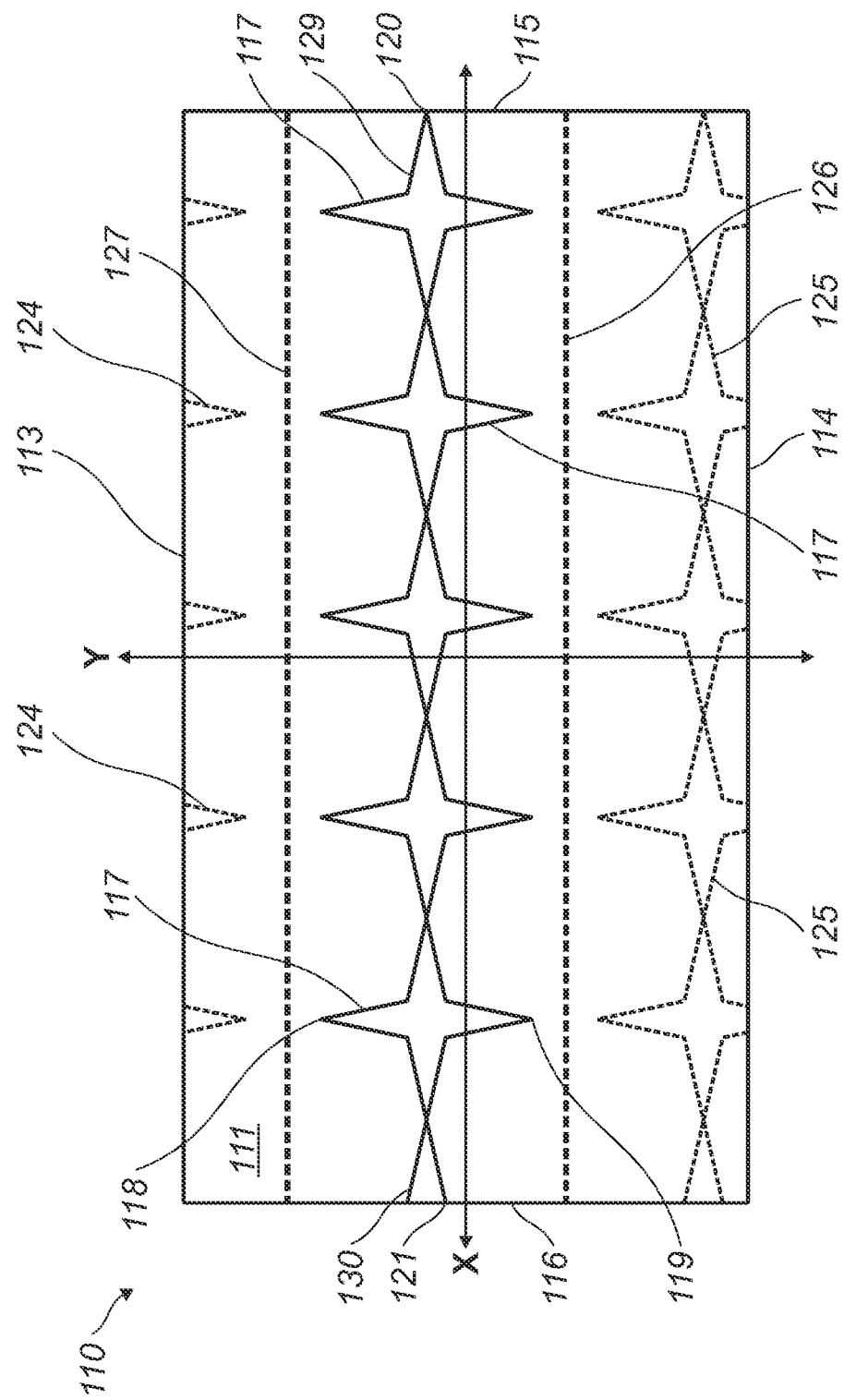
FIG. 1 is a top view of a row template of a first embodiment.
Figure 6:
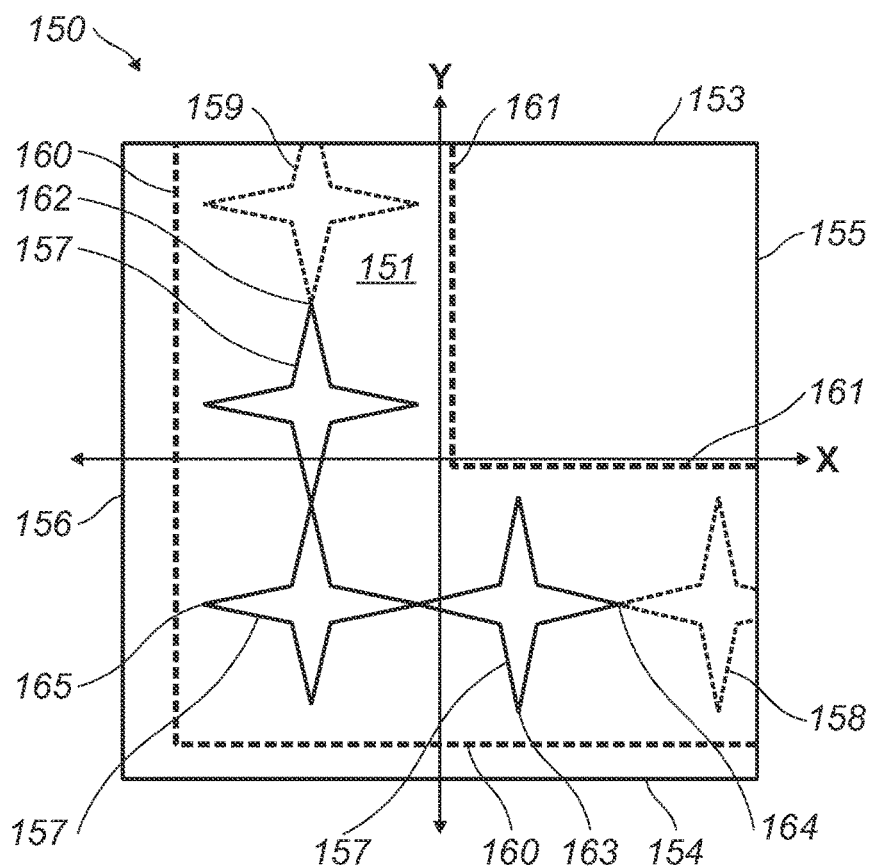
FIG. 6 is a top view of the first embodiment of a corner template.
Figure 9:
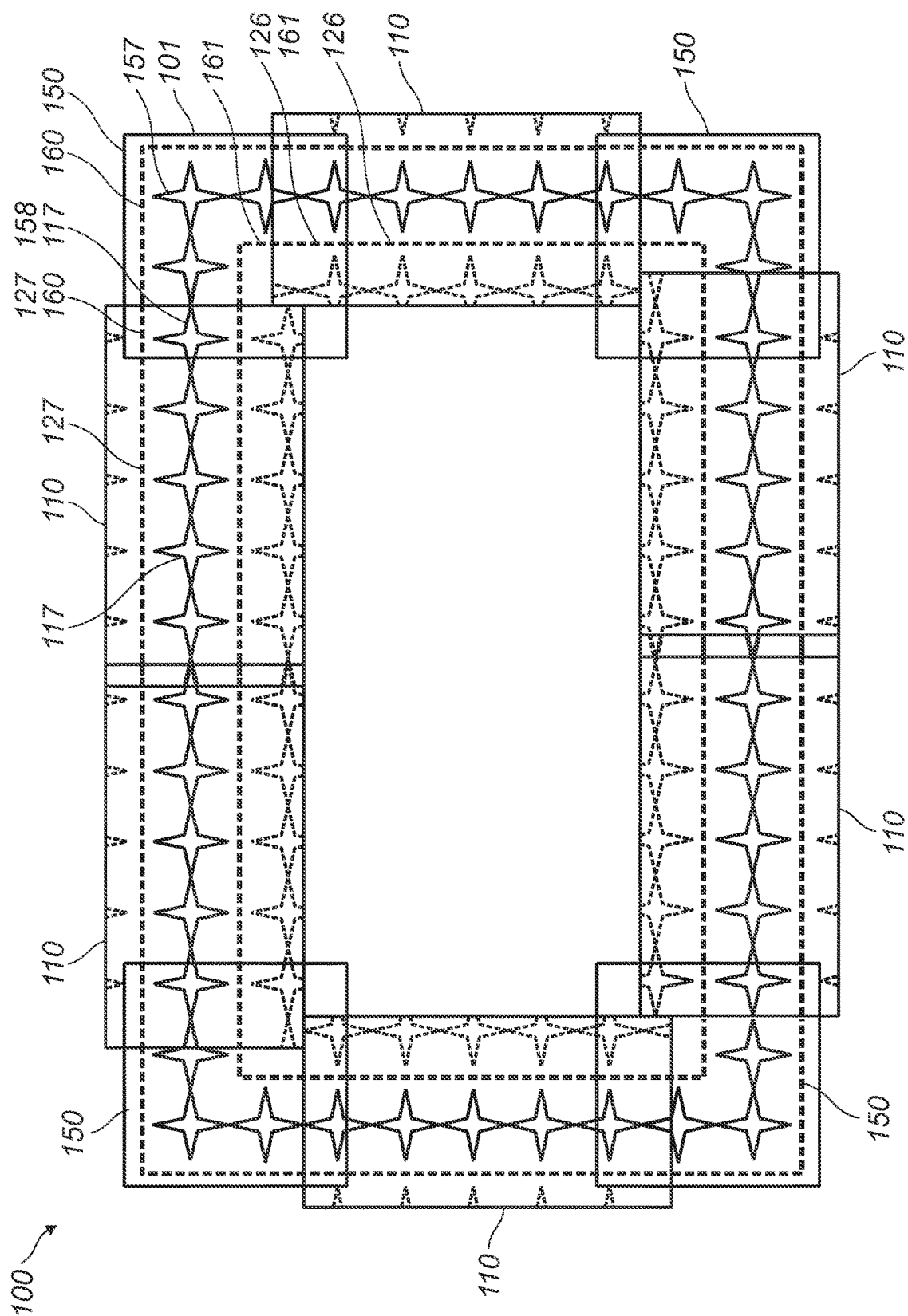
FIG. 9 is a top view of a series of quilt templates view of the first embodiment forming a complete quilt border template comprised of corner templates linked to row templates.

Referring to FIGS. 1, 6, and 9, the translucent tear away quilting template 100 comprises a row template 110 and a corner template 150. Specifically referring to FIG. 1, the generally rectangular shape row template 110, having an x and y axis, comprises a front surface 111, rear surface (not shown), top edge 113, bottom edge 114, right edge 115, and left edge 116. A solid line pattern 117 is printed on the front surface 11. The solid line pattern 117 has a top boundary 118 at the vertically highest point, bottom boundary 119 at the vertically lowest point, right boundary 120 at the right most point, and left boundary 121 at the left most point. In the first disclosed embodiment, the solid line pattern 117 is a symmetrical four pointed star with five exact iterations continuously linked and arranged in a singular row. The solid line pattern may be a variety of shapes and be repetitive, continuous, and/or symmetrical. If the solid line pattern has repetitions, any number of repetitions may be present. The solid line pattern may be arranged in a row or column and may have multiple rows or columns.

A top dashed line pattern 124 is positioned between the top edge 113 and the solid line pattern 117. The top dashed line pattern 124 matches a corresponding portion of the solid line pattern 117. Specifically, the top dashed line pattern 124 matches a corresponding portion of the solid line pattern 117 that is nearest the bottom boundary 119. In the disclosed embodiment, the top dashed line pattern 124 matches a portion of the solid line pattern 117 that includes the bottom boundary 119. Top dashed line pattern 124 is positioned so that the matching corresponding portion of the top dashed line pattern 124 and the solid line pattern 117 are vertically aligned.

A bottom dashed line pattern 125 is positioned between the bottom edge 114 and the solid line pattern 117. The bottom dashed line pattern 125 matches a corresponding portion of the solid line pattern 117. Specifically, the bottom dashed line pattern 125 matches a corresponding portion of the solid line pattern 117 that is nearest the top boundary 118. In the disclosed embodiment, the bottom dashed line pattern 125 matches a portion of the solid line pattern 117 that includes the top boundary 118, right boundary 120, and the left boundary 121. Bottom dashed line pattern 125 is positioned so that the matching corresponding portion of the bottom dashed line pattern 125 and the solid line pattern 117 are vertically aligned.

A first dotted border line 126 is positioned between the bottom dashed line pattern 125 and the bottom boundary 119 of the solid line pattern 117. The first dotted border line 126 may extend from the left edge 116 to the right edge 115 and is parallel to the bottom edge 114. A second dotted border line 127 is parallel to the first dotted border line 126 and is positioned between the top dashed line pattern 124 and the top boundary 118 of the solid line pattern 117. The first dotted border line 126 and second dotted border line 127 are spaced such that the vertical distance between the top boundary 118 of the solid line pattern 117 and the second dotted border line 127 is the same as the vertical distance between the bottom boundary 119 and the first dotted border line 126.

An overlapping portion 130 of the solid line pattern 117 may extend inwardly from the left edge 116 to the right edge 115. The overlapping portion 130 consists of some portion of the solid line pattern 117, such as the left boundary 121 as is disclosed n this embodiment, and generally corresponds to the right boundary 120 of the solid line pattern 117. An indicator line 129 may be located on the solid line pattern 117 closest to the right edge 115. The indicator line 129 may be a part of the solid line pattern 117, such as the right boundary 120 as is disclosed in this embodiment. The indicator line 129 corresponds to a portion of the overlapping portion 130. In alternative embodiments, overlapping line may be colored differently from the solid line pattern or may be dashed. In further embodiments, the overlapping portion and indicator lane may not be related to the solid line pattern.

Figure 2:
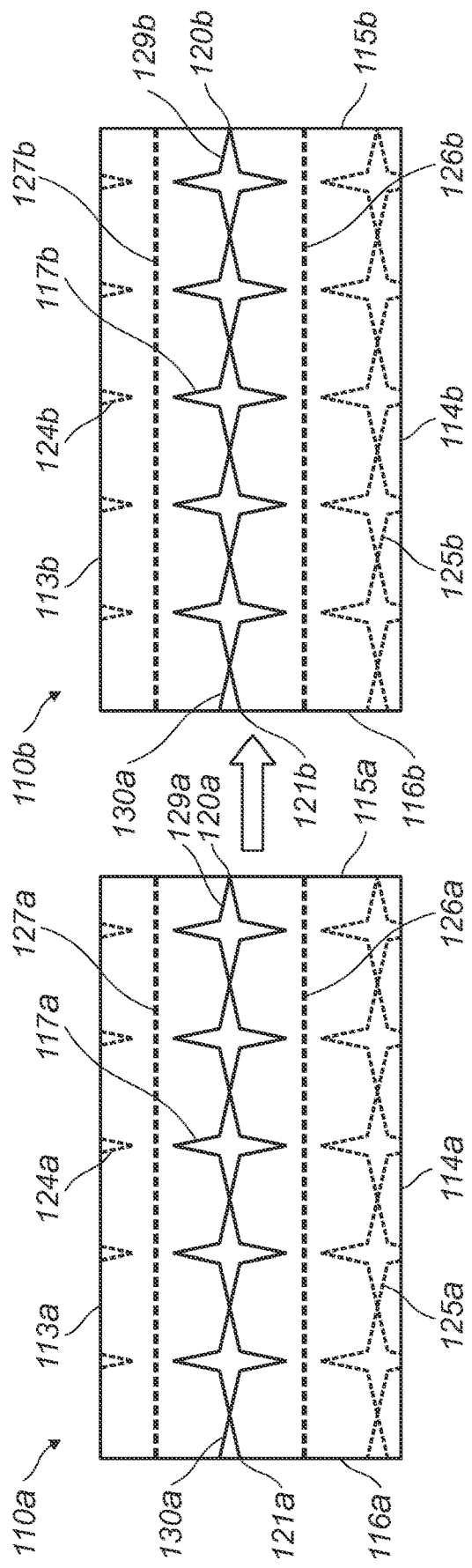
FIG. 2 is a top view of the first embodiment of a first and second row template in position for horizontal linking.
Figure 3:
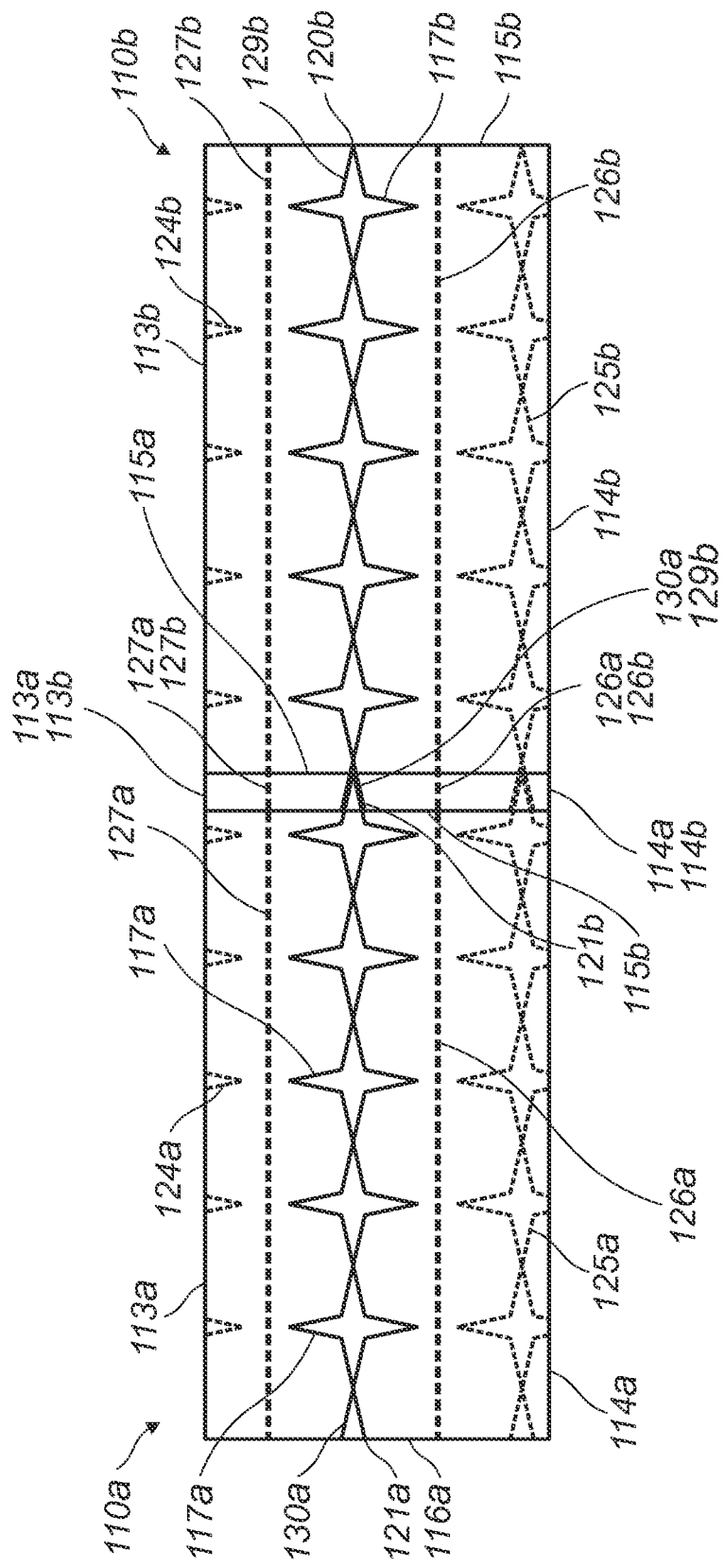
FIG. 3 is a top view of the first embodiment of a first and second row template linked horizontally.

As see in FIGS. 2-5, a first row template 110a may be combined with a second row template 110b to add length or width. As seen in FIGS. 2 and 3, a first row template 110a is positioned over a portion of a second row template 110b so that the overlapping portion 130b of row template 110b is matched to the corresponding indicator line 129a of row template 110a. The first dotted border line 126a of row template 110a is aligned with first dotted border line 126b of row template 110b. The second dotted border line 127a of row template 110a is aligned with second dotted border line 127b of row template 110b. As seen in FIG. 3, the alignment in this manner provides a seamless transition between row templates 110a, 110b and in the first disclosed embodiment combine to form a longer solid line pattern 117 that is aligned, continuous, and uninterrupted. Additional row templates may be added to increase the length of the pattern as necessary. Alternatively, a first row template 110a may be aligned with a second row template 110b such that the right boundary 120a of first row template 110a overlaps a corresponding portion of the left boundary 121b second row template 110b.

Figure 4:
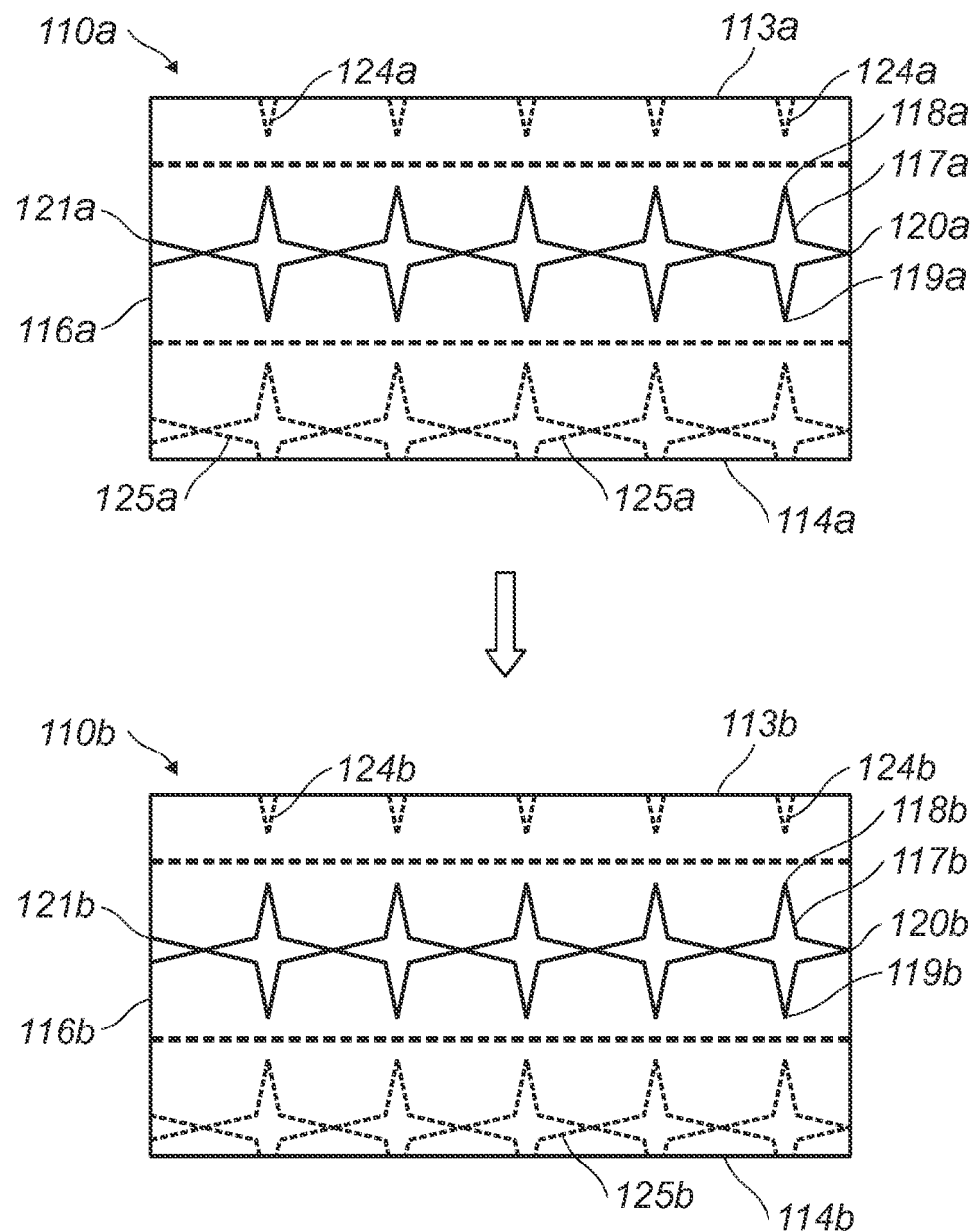
FIG. 4 is a top view of the first embodiment of a first and second row template in position for vertical linking.
Figure 5:
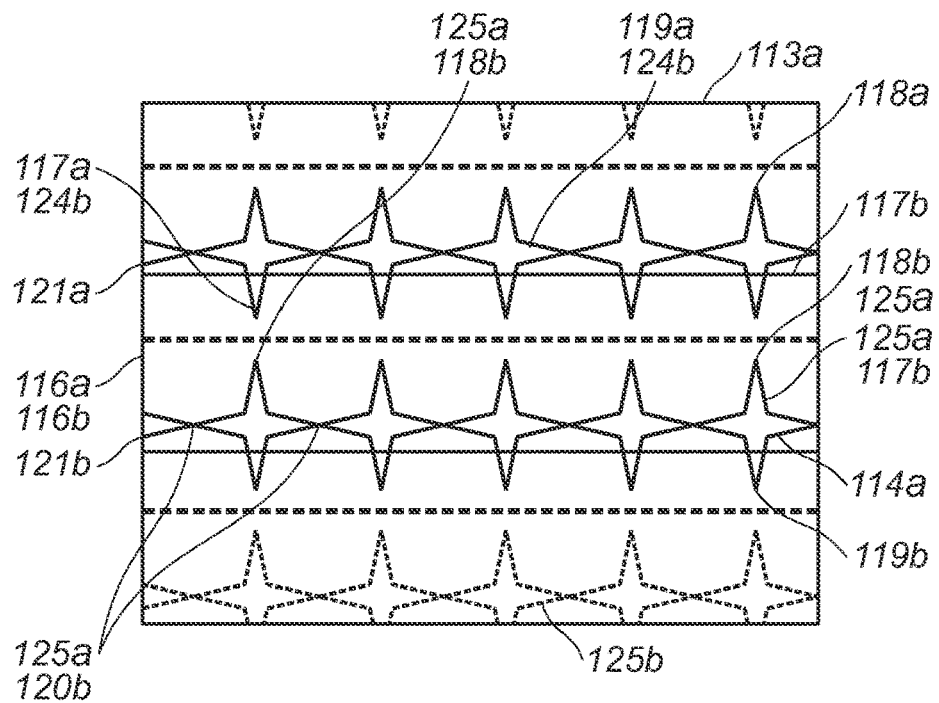
FIG. 5 is a top view of the first embodiment of a first and second row template linked vertically.

As seen in FIGS. 4 and 5, a first row template 110a is positioned over a portion of a second row template 110b. The bottom dashed line pattern 125a of row template 110a is positioned to overlap a portion of the solid line pattern 117b that includes the top boundary 118b of row template 110b. Similarly, the solid line pattern 117a that includes the bottom boundary 119a is positioned to overlap top dashed line pattern 124b of row template 110b As seen in FIG. 5, the alignment in this manner provides a seamless transition between row templates 110a, 110b and in the first disclosed embodiment combine to form two rows of solid line patterns 117 that are parallel and vertically aligned. Additional row templates may be stacked to increase the width of the pattern as necessary.

As seen in FIG. 6, the generally square corner template 150, having an x and y axis, comprises a front surface 151, rear surface, top edge 153, bottom edge 154, right edge 155, and left edge 156. An "L" shaped first dotted border line 160 extends from the top edge 153 and terminates on the right edge 155. A first leg of the first dotted border line 160 is positioned adjacent and parallel to the left edge 156 with a second leg positioned adjacent and parallel to the bottom edge 154. An "L" shaped second dotted border line 161 is positioned with its first leg positioned between the first dotted line 160 and the right edge 155 and parallel to the first leg of the first dotted border line 160 and the second leg positioned between the first dotted line 160 and the top edge 153 and parallel to the second leg of the first dotted border line 160. The distance between the first leg of the first dotted border line 160 and the first leg of the second dotted border line 161 is equal to the distance between the second leg of first dotted border line 126 and the second leg of the second dotted border line 127 of row template 110.

A solid line pattern 157 is positioned between the first dotted border line 160 and the second dotted border line 161 and generally follows an "L" shape there between. The solid line pattern 157 may be identical to the solid line pattern 117, a themed relation to the solid line pattern 117, or completely unrelated to the solid line pattern 117. In the first disclosed embodiment, the solid line pattern 157 is identical to the solid line pattern 117 of row template 110. Additional solid line patterns 157 may be present in the corner template 150. Each solid line pattern 157 has a top boundary 162 at the vertically highest point, bottom boundary 163 at the vertically lowest point, right boundary 164 at the right most point, and left boundary 165 at the left most point.

A first dashed line pattern 158 is positioned between the right edge 155 and the right boundary 164 of the solid line pattern 157. The first dashed line pattern 158 matches a corresponding portion of the solid line pattern 117. Specifically, the first dashed line pattern 158 corresponds to the portion of the solid line pattern 117 that is at or adjacent to the left boundary 121 in the disclosed embodiment, the first dashed line pattern 158 matches a portion of the solid line pattern 117 that includes the top boundary 118, bottom boundary 119, and left boundary 121.

A second dashed line pattern 159 is positioned between the top edge 153 and the left boundary 162 of the solid line pattern 157. The second dashed line pattern 159 matches a corresponding portion of the solid line pattern 117. Specifically, the second dashed line pattern 159 corresponds to the portion of the solid line pattern 117 that is at or adjacent to the bottom boundary 119 in the disclosed embodiment, the second dashed line pattern 159 matches a portion of the solid line pattern 117 that includes the left boundary 121, bottom boundary 119, or right boundary 120.

Figure 7:
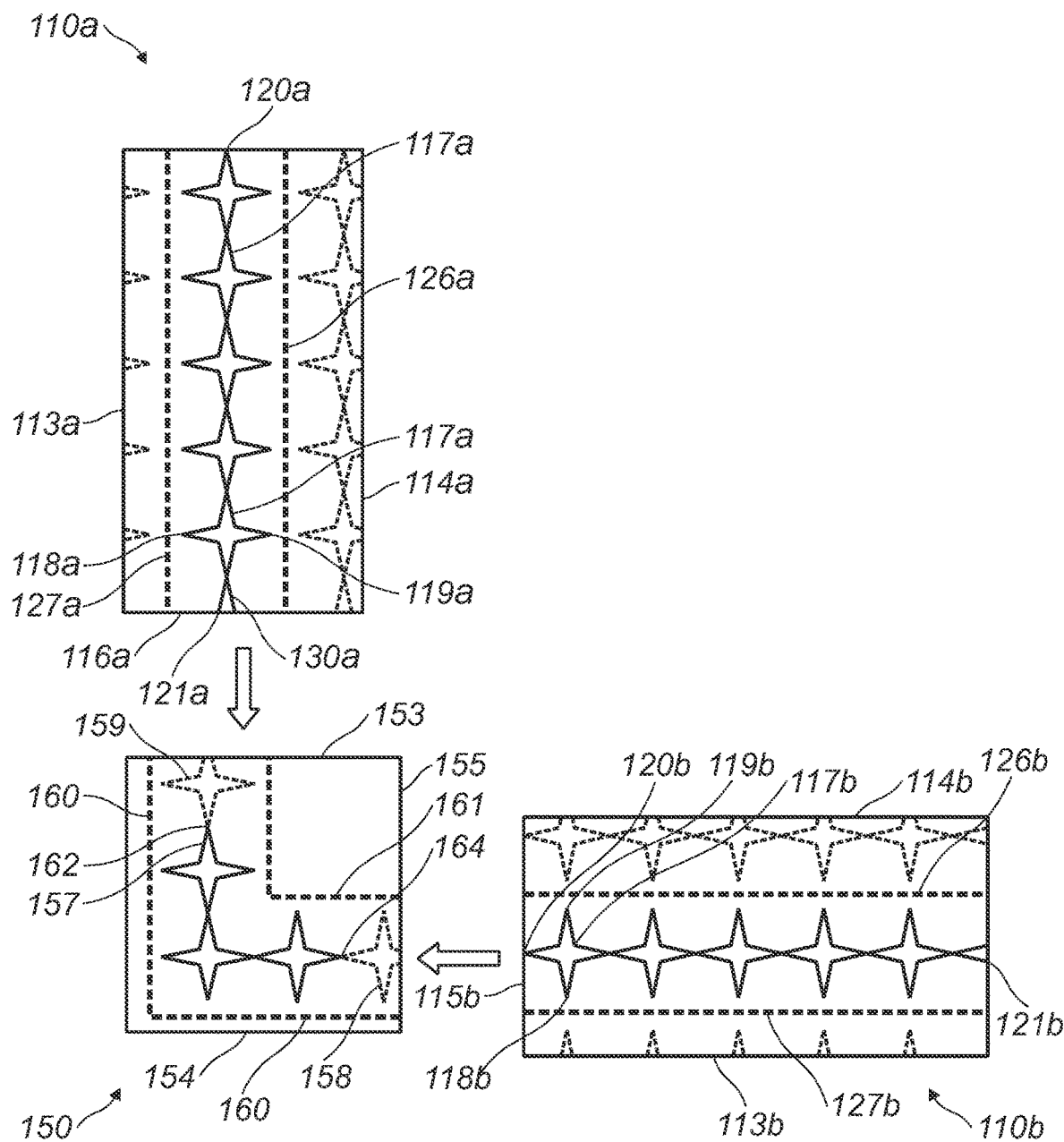
FIG. 7 is a top view of the first embodiment of a corner template in position for linking with a first and second row template.
Figure 8:
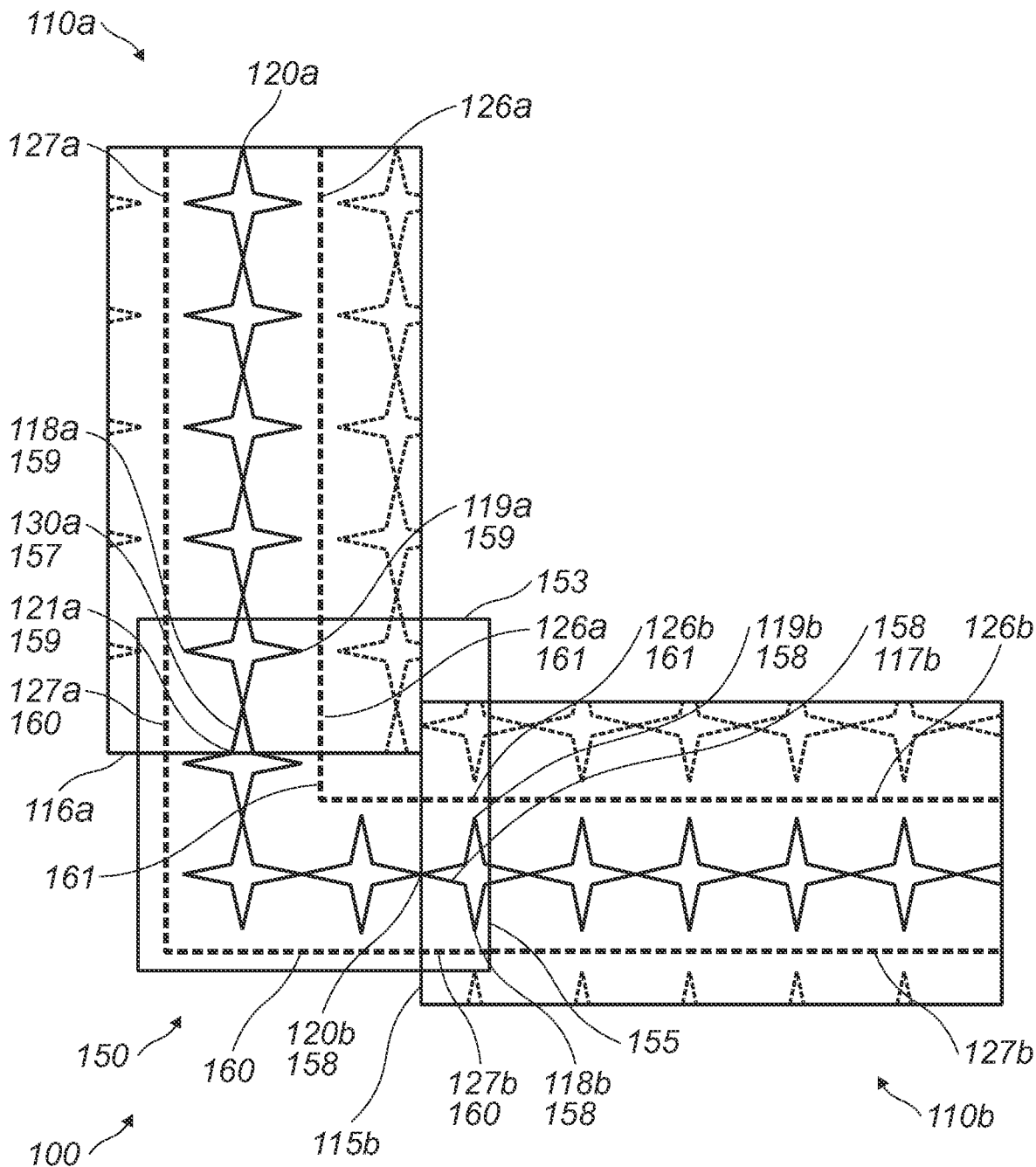
FIG. 8 is a top view of the first embodiment of a corner template linked with a first and second row template.

As seen in FIGS. 7 and 8, row templates 110a and 110b may be aligned with corner template 150. Row template 110a is positioned such that the left edge 116a is positioned over the top edge 153 of the corner template 150. The overlapping portion 130a matches with a corresponding portion of the solid line pattern 157 that includes the top edge 162. Similarly, the second dashed line pattern 159 is placed over and aligned with a matching and corresponding portion of the solid line pattern 117a that is nearest to the left edge 116a, such that the portions of the solid line pattern 117a that include the top boundary 118a, bottom boundary 119a, and left boundary 121a overlap second dashed line pattern 159. Once aligned, the second dotted border line 127a of row template 110a is directly in line with the first dotted border line 160 of the corner template 150. The second dotted border line 127a and the first dotted border line 160 may overlap but at a minimum must be aligned and form a straight line. Once aligned, the first dotted border line 126a of row template 110a is directly in line with the second dotted border line 161 of the corner template 150. The first dotted border line 126a and the second dotted border line 161 may overlap but at a minimum must be aligned and form a straight line.

Row template 110b is rotated and positioned such that the right edge 115b is positioned over the right edge 155 of the corner template 150 such that the first dashed line pattern 158 is aligned with a corresponding portion of the solid line pattern 117b that is nearest to the right edge 115b, such that the portions of the solid line pattern 117b that include the top boundary 118b, bottom boundary 119b, and right boundary 120b overlap first dashed line pattern 158. Once aligned, the second dotted border line 127b of row template 110b is directly in line with the first dotted border line 160 of the corner template 150. The second dotted border line 127b and the first dotted border line 160 may overlap but at a minimum must be aligned and form a straight line. Once aligned, the first dotted border line 126b of row template 110b is directly in line with the second dotted border line 161 of the corner template 150. The first dotted border line 126b and the second dotted border line 161 may overlap but at a minimum must be aligned and form a straight line.

In the preferred embodiment, the row template 110 and corner template 150 are made of a translucent, white tissue paper having a weight between 10 pounds and 15 pounds, translucent, and white. Other materials such as fine cloth may be used so long as the material is translucent. While other colors may be utilized, white is preferable to view the solid pattern lines, dashed line patters, and dotted lines. In the preferred embodiment the solid pattern line, the dashed line pattern, and the dotted border lines are printed in a black ink. Other colors may be utilized so long as there is sufficient contrast between the ink and color of the paper.

As seen in FIG. 9, a complete border template may be created for a quilt 101 utilizing row templates 110 and corner templates 150. The quilt 101 should be basted so that the layers of the quilt are temporarily joined to prevent shifting during sewing. Once the quilt is basted, the row templates 110 and corner templates 150, once aligned, may be affixed to the quilt using an adhesive or basting spray. The row templates 110 may be combined to add length as disclosed in FIGS. 2-3. The row templates 110 may be aligned with the corner templates as disclosed in FIGS. 7.8. One of ordinary skill in the art will recognize that due to the symmetrical nature of the solid line pattern 117, the corner template 150 may be rotated to align with the row template 110 as necessary to create the desired corner. The portions of the solid line pattern 117 that include the top boundary 118, bottom boundary 119, right boundary 120, and left boundary 121 will always match the first dashed line pattern 158 and second dashed line pattern 159 regardless of the orientation. Once the templates are affixed across the entire quilt 101, or for the section to be stitched, the quilt may be stitched using a long arm machine or domestic sewing machine by following the solid pattern lines of each of the templates. Once the quilt is stitched, the templates should be ripped away from the quilt. Tweezers may be used to remove any small bits of tear away paper that remains under the stitches.

Similarly, the interior of the quilt, or non-border area, may be aligned by combining one or more row templates as disclosed in FIGS. 2-5. The row templates are affixed to the quilt in the same manner as discussed above. Alternatively, a quilt may not utilize a separate stitched pattern and the row templates may be utilized for the entire quilt.

Figure 10:
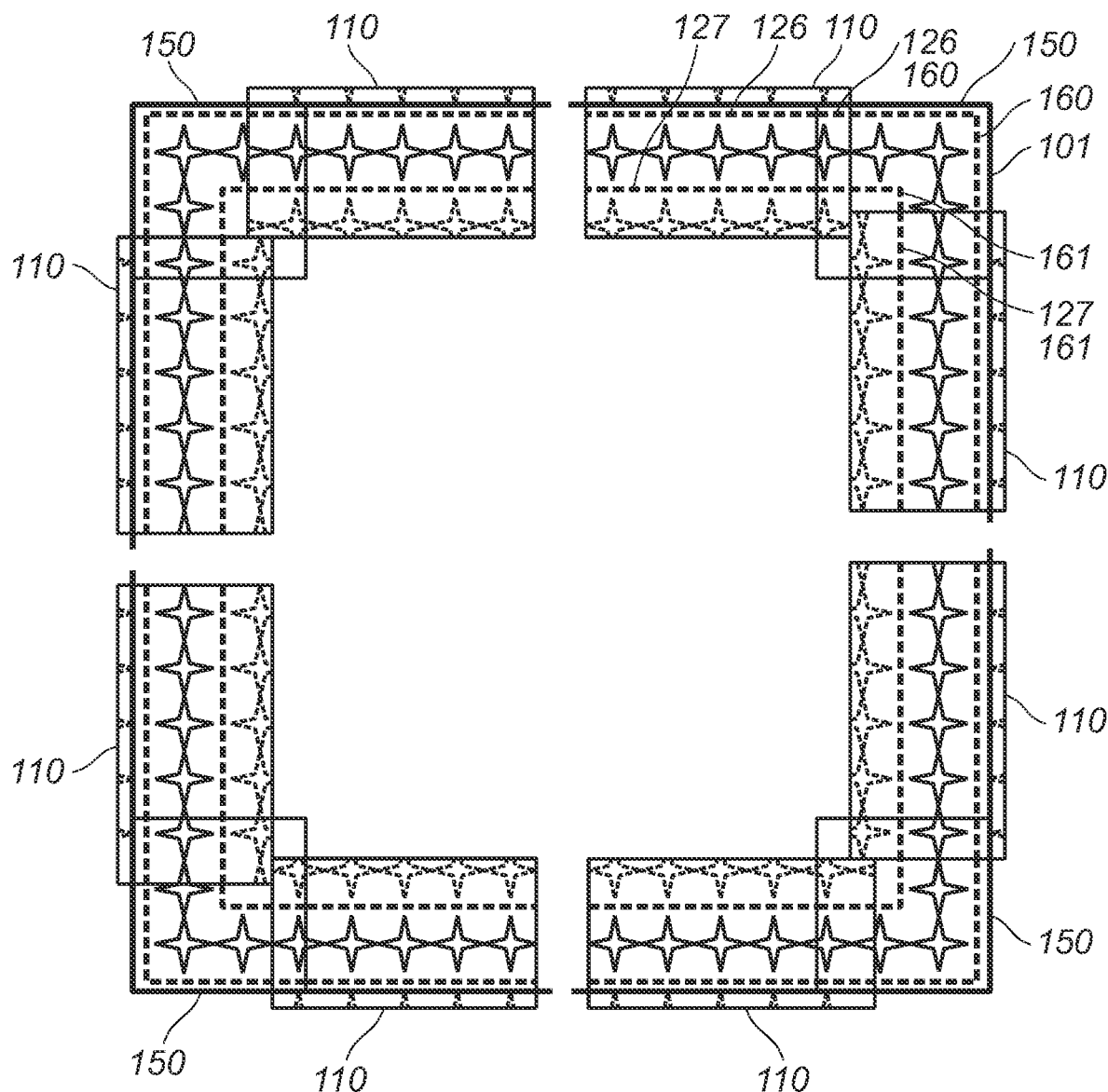
FIG. 10 is a top view of a series of quilt templates view of the first embodiment forming an alternative complete quilt border template comprised of corner templates linked to row templates.

FIG. 10 discloses an alternative border construction method. In this embodiment, the corner template is affixed to the corner of a quilt as disclosed above. A row template is added and extends from each corner template towards the approximate center line as measured between the two corners of the side of the quilt. The same procedure may be utilized to create all four of the corners of the quilt. Each corner as shown in FIG. 10 is a mirror image from each other corner over an x-axis, y-axis or both. This procedure permits the row template to be cut to size depending on the desired length. This procedure also permits the creation of a border when the length or width of the quilt does not match perfectly with predetermined sizes of the solid line pattern 117 and solid line pattern 157.

Second Embodiment

The teachings of the first embodiment are carried over into the second embodiment. However, the second embodiment concerns a more complex solid line pattern. A solid line pattern that is not symmetrical across all planes creates complications in aligning respective dashed line patterns with solid line patterns.

Referring to FIGS. 11, 14, 15, and 18, the translucent tear away quilting template 1, having an x and y axis, comprises a row template 10, a first corner template 50, and a second corner template 80. Specifically referring to FIG. 11, the row template 10 comprises a front surface 11, rear surface (not shown), top edge 13, bottom edge 14, right edge 15, and left edge 16. A solid line pattern 17 may be printed on the front surface 11. As seen more closely in FIG. 12 (box A from FIG. 11), the solid line pattern 17 is better detailed in reference in reference to halves and quadrants created by reference x-axis and a reference y-axis. Still referring to FIG. 12, the solid line pattern 17 may have a right portion 18 corresponding to the pattern positioned to the right of the y-axis and a left portion 21 corresponding to the pattern positioned to the left of the y-axis. The right portion 18 may further comprise a top right portion 19 which corresponds to the pattern positioned in the quadrant located right of the y-axis and above the x-axis and a bottom right portion 20 which corresponds to the pattern positioned in the quadrant located right of the y-axis and below the x-axis. The left portion 21 may further comprise a top left portion 22 which corresponds to the pattern positioned in the quadrant located left of the y-axis and above the x-axis and a bottom left portion 23 which corresponds to the pattern positioned in the quadrant located left of the y-axis and below the x-axis. The solid line pattern 17 exists in all four quadrants in the preferred embodiment but alternative embodiments may have one or more quadrants without any solid line pattern 17. As used herein, a reference to the quadrant, portion or half, is a reference to the solid line pattern 17 that is present within the quadrant, portion, or half.

Referring back to FIG. 11, the solid line pattern 17 repeats in the horizontal direction. In the portion of the solid line pattern 17 nearest to the left edge 16, a left portion 21 may be positioned near the left edge 16. In the portion of the solid line pattern 17 nearest to the right edge 15, a right portion 18 may be positioned near the right edge 15. The solid line pattern 17 may also repeat in the vertical direction. In this disclosed embodiment, the solid line pattern 17 repeats vertically forming two identical rows and repeats horizontally forming three identical columns. The top row may be directly above the bottom row. In alternative embodiments there may be one or more rows and one or more columns.

A top dashed line pattern 24 may be positioned between the top edge 13 and the top right portion 19 and top left portion 22 of the solid line pattern 17 positioned nearest the top edge 13. The top dashed line pattern 24 may have a portion extending into the quadrants of a top right portion 19 and a top left portion 22 of the solid line pattern 17. The top dashed line pattern 24 may extend from near the left edge 16 to near the right edge 15. The top dashed line pattern 24 may correspond to a right bottom portion 20 and a left bottom portion 23 of the solid line pattern 17 positioned directly below it and nearest the bottom edge 14 such that the top dashed line pattern 24 has the same pattern as at least a portion of a bottom right portion 20 and a bottom left portion 23 of the solid line pattern 17 positioned directly below it and nearest the bottom edge 14. A bottom dashed line pattern 25 may be positioned between the bottom edge 14 and a bottom right portion 20 and a bottom left portion 23 of the solid line pattern 17. The bottom dashed line pattern 25 may extend from near the left edge 16 to near the right edge 15. The bottom dashed line pattern 25 may have a portion extending into the quadrants of a bottom right portion 20 and a bottom left portion 23 of the solid line pattern 17. The bottom dashed line pattern 25 matches and corresponds to a top right portion 19 and a top left portion 22 of the solid line pattern 17 such that the bottom dashed line pattern 25 has the same pattern as at least a portion of a right top portion 19 and a left top portion 22 of the solid line pattern 17.

A first dotted border line 26 may be positioned over the bottom dashed line pattern 25 between the solid line pattern 17 and the bottom edge 14. The first dotted border line 26 extends from the left edge 16 to the right edge 15. A second dotted border line 27 may be parallel to the first dotted border line 26 and is positioned between the first dotted border line 26 and the top edge 13 such that a single row of the solid line pattern 17 is positioned between the first dotted border line 26 and second dotted border line 27. Alternative embodiments may include more than one row of the solid line pattern 17 between the first dotted border line 26 and second dotted border line 27. The first dotted border line 26 and second dotted border line 27 may overlay other printed designs such as the solid line pattern 17 and/or the bottom dashed line pattern 25.

Figure 11:
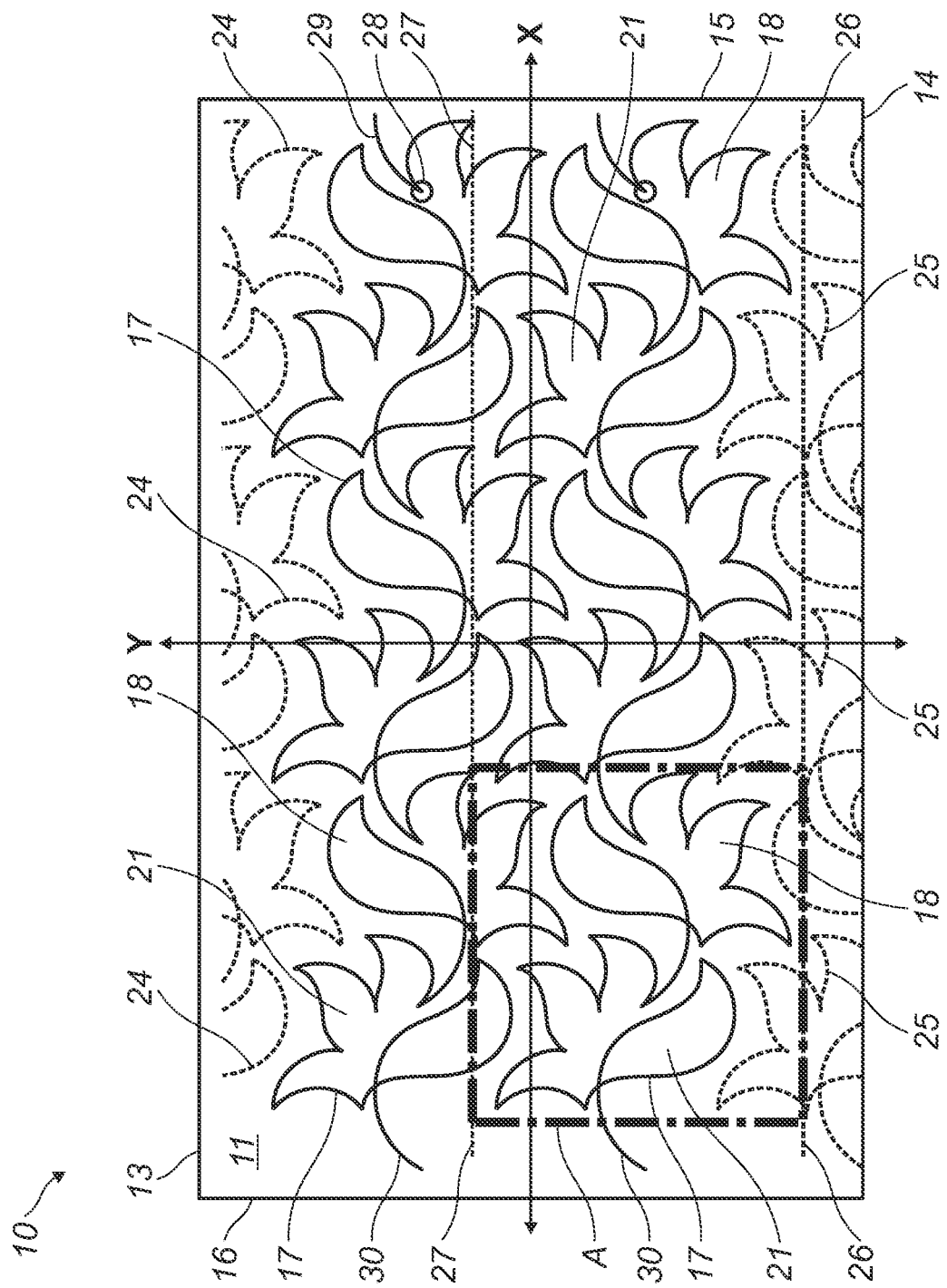
FIG. 11 is a top view of a second embodiment of a row template.
Figure 13:
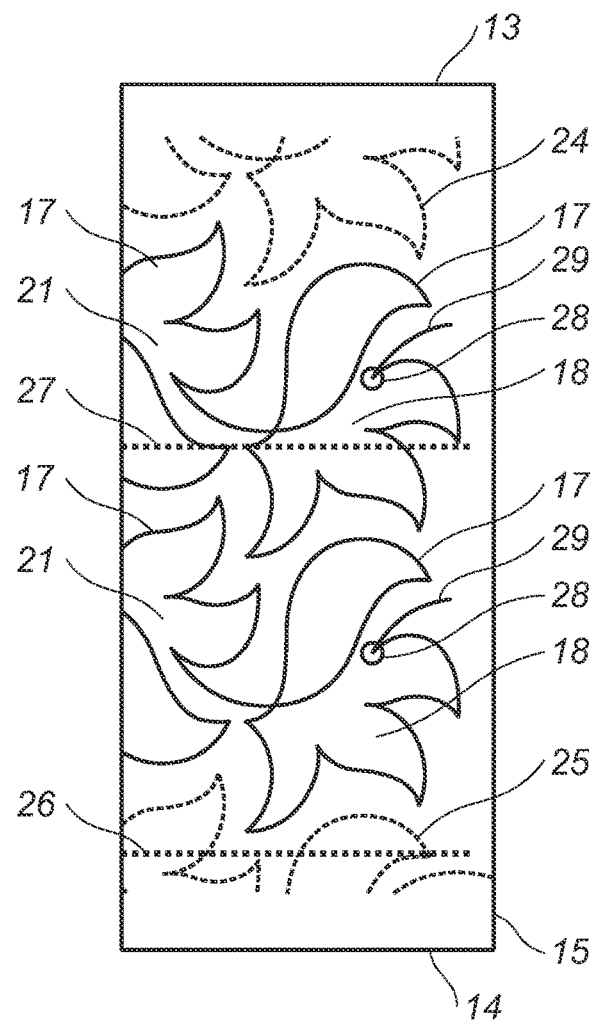
FIG. 13 is a close up view of a second embodiment of the right edge of a row template.

As seen in FIG. 11 and in FIG. 13, an alignment indicator 28 may label a position within a right portion 18 of the solid line pattern 17 nearest to the right edge 15. In this disclosed embodiment, the alignment indicator 28 is a circle and includes the label "LINE UP HERE." The solid line pattern 17 in the disclosed embodiment features two rows, thus, there is an alignment indicator 28 for the top row and the bottom row. The indicator line 29 of the solid line pattern 17 may extend from the indicator 28 towards the right edge 15. An overlapping line 30 of the solid line pattern 17 may extend from the let most left portion 21 of the solid line pattern 17 towards the left edge 16. The overlapping line 30 corresponds to the indicator line 29. In alternative embodiments, an alignment indicator 28 may be placed on both the overlapping line 30 and indicator line 29. In other embodiments either the overlapping line 30 or the indicator line 29 may be eliminated so long as an alignment indicator 28 is located near the right edge and left edge capable of aligning the solid line pattern 17. In a further alternative embodiment, the overlapping line 30 may be dashed.

Figure 14:
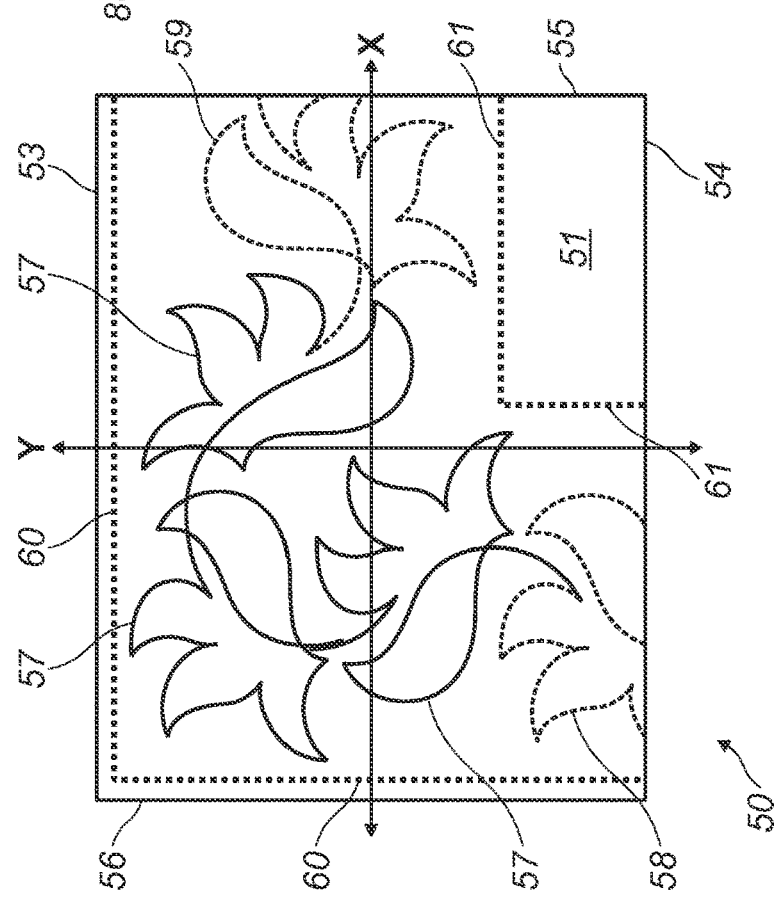
FIG. 14 is a top view of a second embodiment of a first corner template.

Specifically referring to FIG. 14, the first corner template 50, having an x and y axis, comprises a front surface 51, rear surface (not shown), top edge 53, bottom edge 54, right edge 55, and left edge 56. A solid line pattern 57 is printed on the front surface 51. The solid line pattern 57 is elbow shaped as it extends along the near left edge 56 from near the bottom edge 54 to near the top edge 53, and along the near top edge 53 from near the left edge 56 to the near the right edge 55. The solid line pattern 57 may be a continuous single pattern or a series of repeating patterns. The solid line pattern 57 may generally correspond in shape to the solid line pattern 17 and may connect with the solid line pattern 17.

Figure 12:
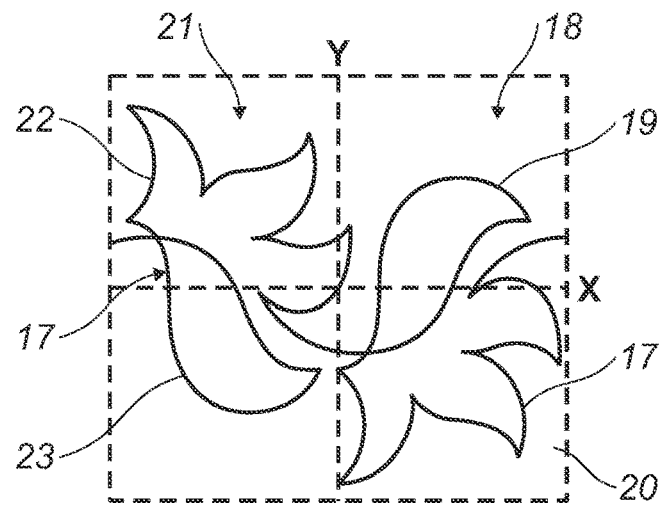
FIG. 12 is a close up view of box A shown in FIG. 11 with a grid line.

A first dashed line pattern 58 is generally positioned between the bottom edge 54 and the solid line pattern 57. The first dashed line pattern 58 matches and corresponds to a left portion 21 of the solid line pattern 17 as seen in FIGS. 11 and 12. A second dashed line pattern 59 is generally positioned between the right edge 55 and the solid line pattern 57. The second dashed line pattern 59 corresponds to a right portion 18 of the solid line pattern 17 as seen in FIGS. 11 and 12 and may connect with the solid line pattern 57.

An "L" shaped first dotted border line 60 extends from the bottom edge 54 and terminates on the right edge 55. A first log of the first dotted border line 60 is adjacent and parallel to the left edge 56 with a second leg adjacent and parallel to the top edge 53. An "L" shaped second dotted border line 61 has a first leg parallel to the first leg of the first dotted border line 60 and positioned between the first leg of the first dotted border line 60 and the right edge 55 and a second leg parallel to the second leg of the first dotted border line 60 and positioned between the second leg of the first dotted border line 60 and the bottom edge 54. The distance between the first dotted border line 60 and the first leg of the second dotted border line 61 is equal to the distance between the second leg of the first dotted border line 60 and the second leg of the second dotted border line 61 and is also equal to the distance between the first dotted border line 26 and second dotted border line 27 of row template 10.

Figure 15:
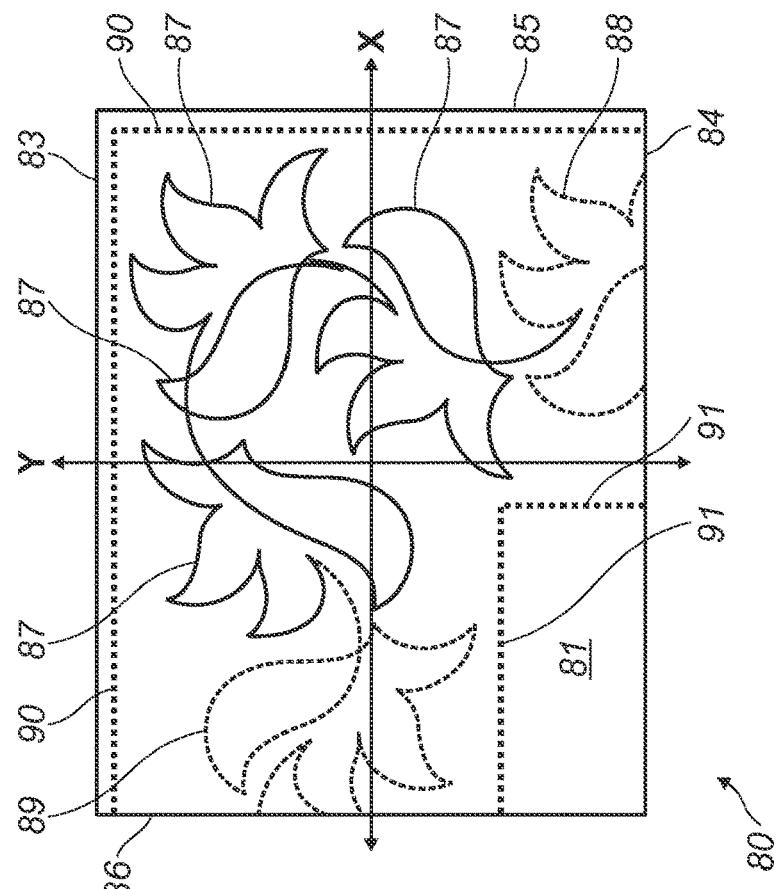
FIG. 15 is a top view of a second embodiment of a second corner template.

Specifically referring to FIG. 15, the second corner template 80, having an x and y axis, comprises a front surface

81, rear surface (not shown), top edge 83, bottom edge 84, right edge 85, and left edge 86. The second corner template 80 is a mirror image of the first corner template 50. A solid line pattern 87 may be printed on the front surface 81. The solid line pattern 87 may follow a general "L" shape as it extends along the near right edge 85 from near the bottom edge 84 to near the top edge 83, and along the near top edge 83 from near the right edge 85 to the near the left edge 86. The solid line pattern 87 may be a continuous single pattern or a series of repeating patterns. The solid line pattern 87 may generally correspond in shape to the solid line pattern 57 of the first corner template 50 and the solid line pattern 17 and may connect with the solid line pattern 17.

A first dashed line pattern 88 may be positioned generally between the bottom edge 84 and the solid line pattern 87. The first dashed line pattern 88 may match and correspond to a right portion 18 of the solid line pattern 17 as seen in FIGS. 11 and 12. The first dashed line pattern 88 may connect with the solid line pattern 87. A second dashed line pattern 89 may be positioned generally between the left edge 86 and the solid line pattern 87. The second dashed line pattern 89 may match and correspond to the left portion 21 of the solid line pattern 17 rotated 180 degrees from the position as seen in FIGS. 11 and 12. The second dashed line pattern 89 may connect with the solid line pattern 87.

An "L" shaped first dotted border line 90 extends from the bottom edge 84 and terminates on the left edge 86. The first leg of the first dotted border line 90 is adjacent and parallel to the right edge 85 with the second leg adjacent and parallel to the top edge 83. An "L" shaped second dotted border line 91 has a first leg parallel to the first leg of the first dotted border line 90 and positioned between the first dotted border line 90 and the left edge 86 and a second leg parallel to the second leg of the first dotted border line 90 and positioned between the first dotted border line 90 and the top edge 93. The distance between the first dotted border line 90 and the first leg of the second dotted border line 91 is equal to the distance between the second leg of the first dotted border line 90 and the second leg of the second dotted border line 91 and is also equal to the distance between the first dotted border line 26 and second dotted border line 27 of row template 10.

In the preferred embodiment, the row template 10, a first corner template 50, and a second corner template 80 are a translucent, white tissue paper having a weight between 10 pounds and 15 pounds. While other colors may be utilized, white is preferable to view the solid pattern lines, dashed line patterns, and dotted lines.

Figure 16:
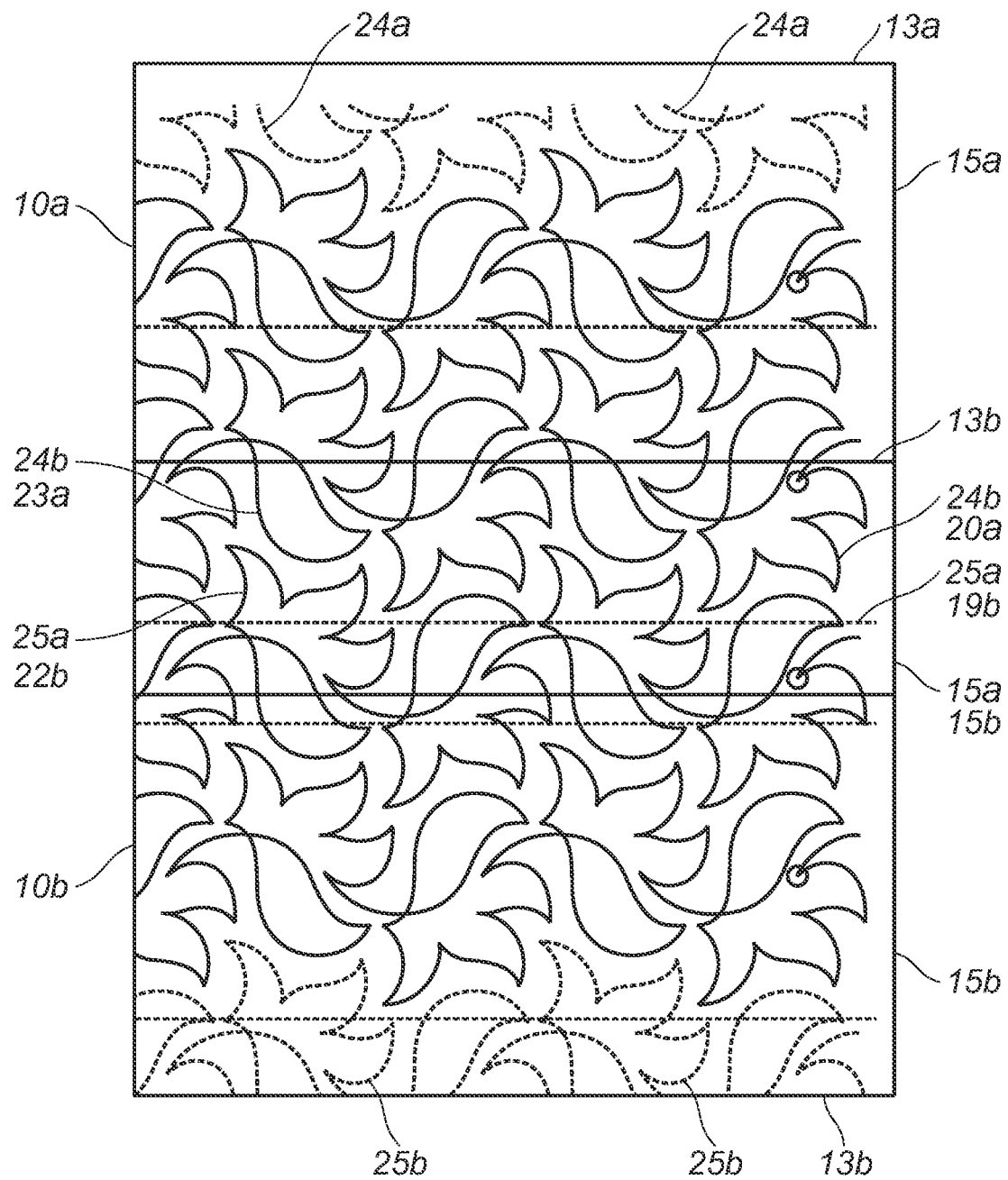
FIG. 16 is a top view of a second embodiment of a first and second row template linked vertically.
Figure 17:
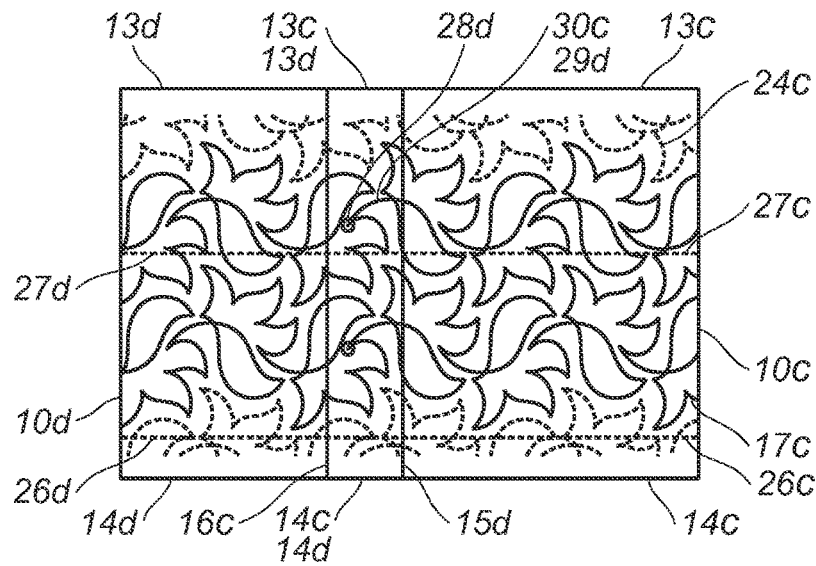
FIG. 17 is a top view of a second embodiment of a first and second row template linked vertically.

As see in FIGS. 16 and 17, the row template may be combined with a second row template to add length or width. As seen in FIG. 16, a first row template 10*a* is positioned over a portion of a second row template 10*b*. The bottom dashed line pattern 25*a* of row template 10*a* is positioned to overlap the right top portion 19*b* and left top portion 22*b* of row template 10*b*. Similarly, the right bottom portion 20*a* and left bottom portion 23*a* of row template 10*a* is positioned to overlap top dashed line pattern 24*b* of row template 10*b*. The translucent nature of the templates permits the user to see the position of solid line patterns 17*a* and 17*b* with the corresponding top dashed line pattern 24*b* and bottom dashed line pattern 25*a*. Additional row templates may be stacked to increase the width of the pattern as necessary.

As seen in FIG. 17, a first row template 10*c* may be positioned over a portion of a second row template 10*d*. The overlapping line 30*c* of row template 10*c* is matched over the indicator line 29*d* of row template 10*d*. The terminal end of the overlapping line 30*c* is positioned over the alignment indicator 28*d* of row template 10*d*. Additional row templates may be added to increase the length of the pattern as necessary.

Figure 18:
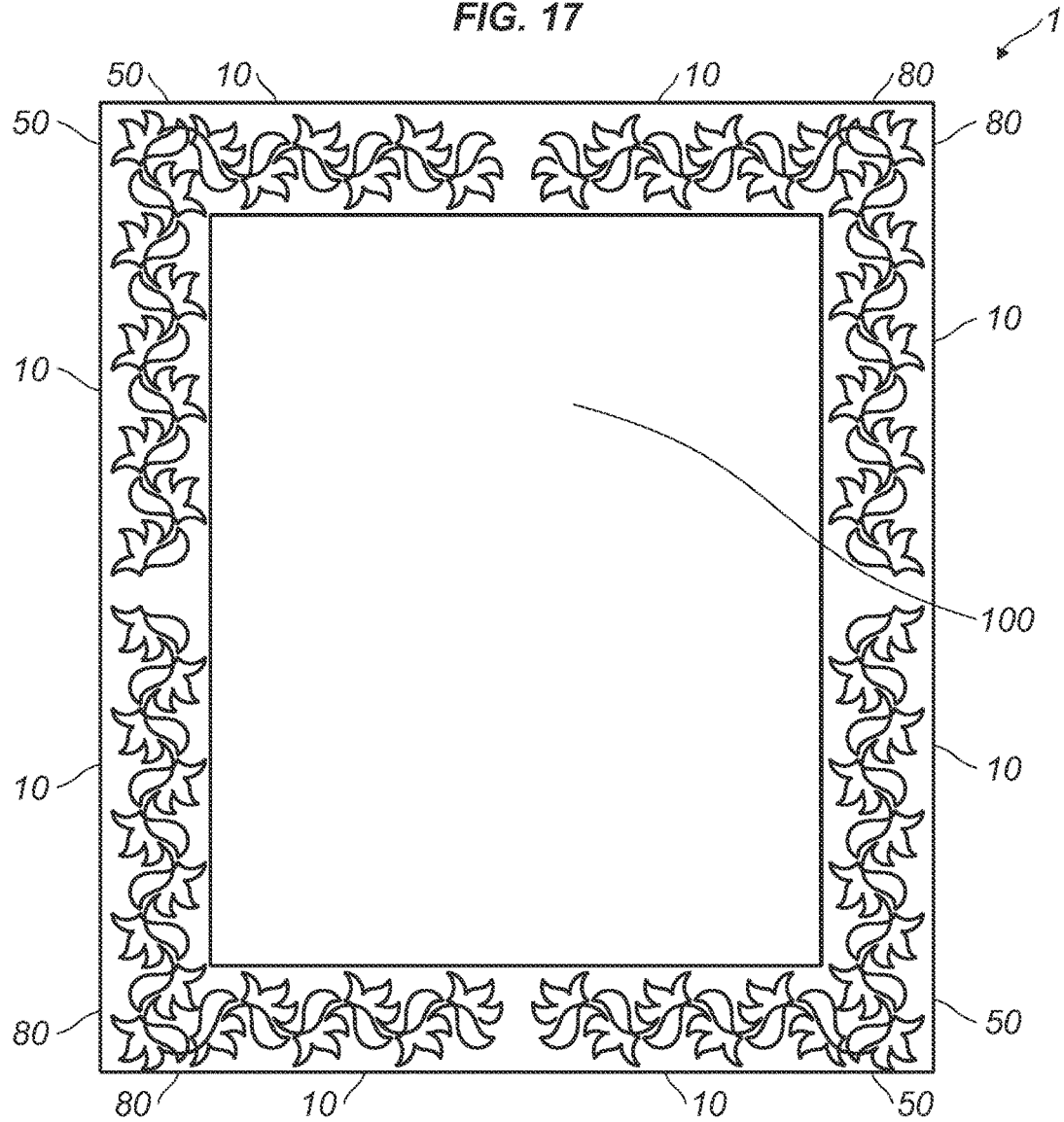
FIG. 18 is a is a top view of a series of quilt templates of a second embodiment forming a complete quilt border template comprised of corner templates linked to a second row templates.
Figure 19:
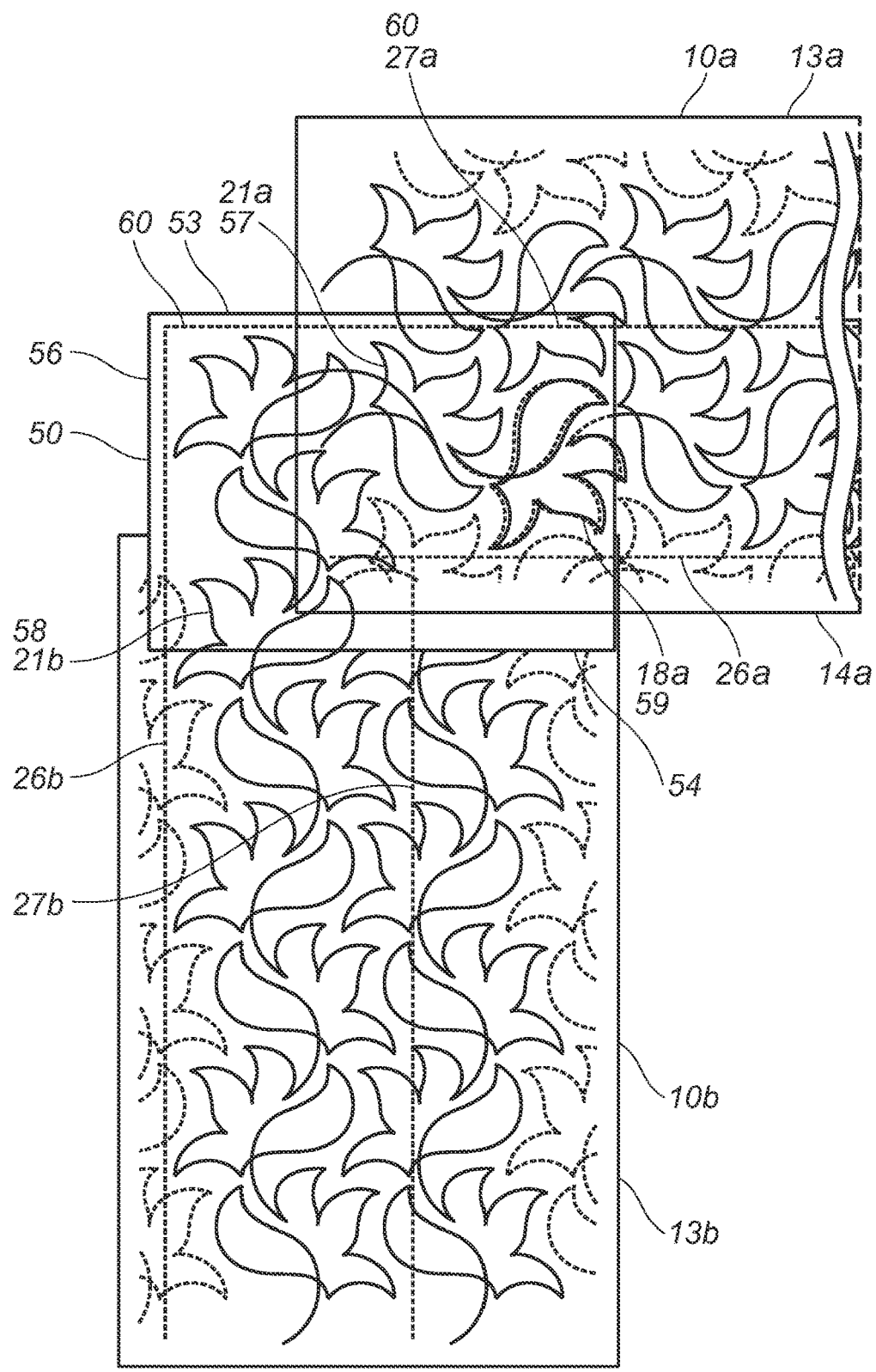
FIG. 19 is a top view of a second embodiment of a first corner template linked with two row templates.

As see in FIG. 18, the first corner template 50, second corner template 80 and partial row template 10 may be combined to form a border around a quilt. As seen in FIG. 19, a first row template 10*a* is positioned over a portion of a first corner template 50. A right portion 18*a* of row template 10*a* is positioned to overlap the second dashed line pattern 59. The translucent nature of the templates permits the user to see the position of the right portion 18*a* to correspond and match with the second dashed line pattern 59. The second leg of the first dotted border line 60 along the top edge 53 should overlap and align with the second dotted border line 27*a* of the row template 10*a*. The second leg of the second dotted border line 60 that extends towards the right edge 55 should overlap and align with the first dotted border line 26*a* of the row template 10*a*. The left portion 21*a* of row template 10*a* may also overlap a portion of the solid line pattern 57 of the first corner template 50.

A second row template 10*b* may align with the first dashed line pattern 58 to complete the corner. A left portion 21*b* of row template 10*b* may be positioned to overlap and align with the first dashed line pattern 58. The translucent nature of the templates permits the user to see the position of a left portion 21*b* to correspond and match with the first dashed line pattern 58. The first leg of the first dotted border line 60 along the left edge 56 should overlap and align with the second dotted border line 27*b* of the row template 10*b*. The second leg of the second dotted border line 61 that extends towards the bottom edge 54 should overlap and align with the first dotted border line 26*b* of the row template 10*b*.

Figure 20:
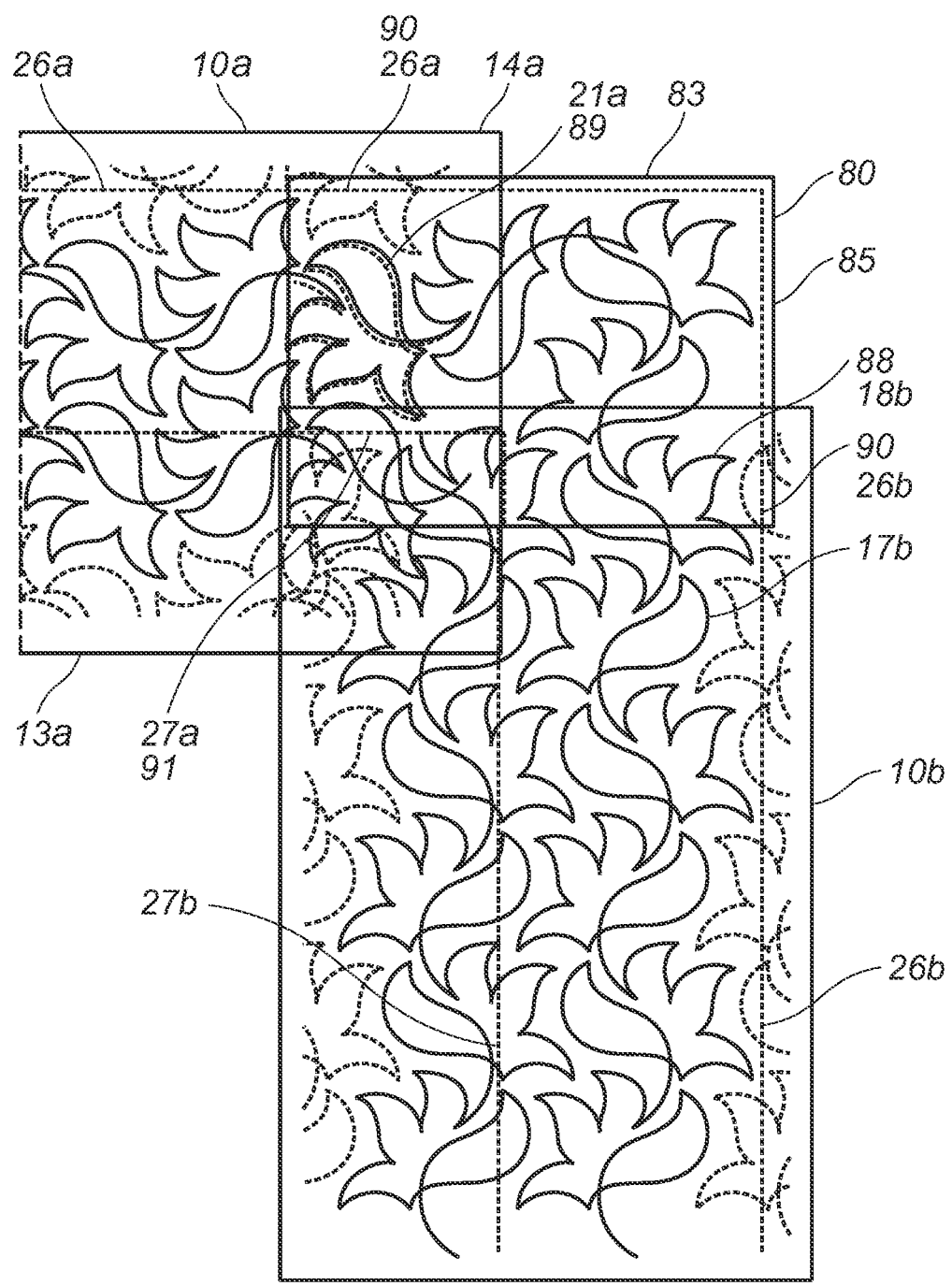
FIG. 20 is a top view of a second embodiment of a second corner template linked with two row templates.

As seen in FIG. 20, a first row template 10*a* is rotated 180 degrees and positioned over a portion of a second corner template 80. A left portion 21*a* of row template 10*a* is positioned to overlap and align with the second dashed line pattern 89. The translucent nature of the templates permits the user to see the position of the left portion 21*a* to correspond and match with the second dashed line pattern 89. The second leg of the first dotted border line 90 along the top edge 83 should overlap and align with the first dotted border line 26*a* of the row template 10*a*. The second leg of the second dotted border line 91 that extends towards the left edge 85 should overlap and align with the second dotted border line 27*a* of the row template 10*a*.

A second row template 10*b* may align with the first dashed line pattern 88 to complete the corner A right portion 18*b* of row template 10*b* may be positioned to overlap the first dashed line pattern 88. The translucent nature of the templates permits the user to see the position of the right portion 18*b* to correspond and align with with the first dashed line pattern 88. The first leg of the First dotted border line 90 along the right edge 85 should overlap and align with the first dotted border line 26*b* of the row template 10*b*. The first leg of the second dotted border line 91 that extends towards the bottom edge 84 should overlap and align with the second dotted border line 27*b* of the row template 10*b*.

As seen in FIG. 18, each row template should only extend from its respective corner overlap to the proximate middle point between the two corners. The same procedure may be utilized to create all four of the corners of the quilt as shown in FIG. 18. Each corner as shown in FIG. 18 is a mirror image from each other corner over an x-axis, y-axis or both.

The row template 10, first corner template 50, and second corner template 80 may be used as a system or individually to stitch a quilt 100. To utilize, the quilt 100 should be basted so that the layers of the quilt are temporarily joined to prevent shifting during sewing. Once the quilt is basted, the row template 10, first corner template 50, and second corner template 80 may be affixed using an adhesive or basting spray. The number of row templates necessary is variable based on the dimensions of the quilt.

Once the templates are affixed across the entire quilt 100, or for the section to be stitched, the quilt may be stitched using a long arm machine or standard sewing machine by following the solid pattern lines of each of the templates. Once the quilt is stitched, the templates should be topped away from the quilt. Tweezers may be used to remove any small bits of tear away paper that remains under the stitches.

A person of ordinary skill in the art would understand a multitude of combinations exist using the row template, first corner template, and second corner template. The overlapping design of the first dashed line patterns and second dashed line patterns of the corner templates with a right portion 18 and a portion 21 of the row template 10 permit numerous combinations.

It is further understood that a premise of the invention is the ability to match and align a first pattern with a second pattern to permit joinder of individual templates. Variations of this concept are envisioned including the use of a different color such that when second pattern is matched with the first pattern, a third color is displayed.

Although specific embodiments of the invention have been described herein in some detail, this has been done solely for the purposes of explaining the various aspects of the invention, and is not intended to limit the scope of the invention as defined in the claims which follow Those skilled in the art will understand that the embodiment shown and described is exemplary, and various other substitutions, alterations and modifications, including but not limited to those design alternatives specifically discussed herein, may be made m the practice of the invention without departing from its scope. Specifically, the teachings of the first embodiment and second embodiment are not mutually exclusive and further embodiments, combing aspects of both embodiments may be utilized. Further, as used herein, align, correspond, and overlap may not require the items referenced to be identical but must be sufficient to align the referenced items as discussed herein.

I claim:

1. A method of applying a tear away quilting template to a fabric comprising the steps of:
   positioning a first row template on the fabric;
   attaching the first row template to the fabric;
   overlapping a second row template over the first row template;
   wherein each first and second row template comprises:
   a generally rectangular translucent paper having a first edge, a second edge opposing the first edge, a third edge, a fourth edge opposing the third edge, a first axis parallel with the first edge and the second edge, and a second axis perpendicular to the first edge and parallel to the third edge and fourth edge;
   a first border line on the translucent paper parallel to the first axis and a second border line on the translucent paper parallel to the first border line;
   a first lined pattern on the translucent paper aligned generally parallel with the first axis and positioned between the first border line and the second border line; and
   a second lined pattern on the translucent paper aligned generally parallel with the first axis and positioned, at least partially, between the first border line and the first edge of the translucent paper nearest the first border line wherein the second lined pattern matches at least a portion of the first lined pattern;
   aligning at least a portion of the first lined pattern of the first row template with the second lined pattern of the second row template; and
   attaching the second row template to the first row template and fabric.

2. The method of applying a tear away quilting template to a fabric of claim 1 further comprising the steps of:
   attaching the first row template to the fabric with adhesive; and
   attaching the second row template to the first row template and the fabric with adhesive.

3. The method of applying a tear away quilting template to a fabric of claim 1 further comprising the steps of:
   overlapping a third row template over the first row template;
   wherein the first row template further comprises a third lined pattern on the translucent paper aligned with the first axis and positioned at least partially between the second border line and the second edge and wherein the third lined pattern matches at least a portion of the first lined pattern;
   wherein the third row template comprises:
   a generally rectangular translucent paper having a first edge, a second edge opposing the first edge, a third edge, a fourth edge opposing the third edge, a first axis parallel with the first edge and the second edge, and a second axis perpendicular to the first edge and parallel to the third edge and fourth edge;
   a first border line on the translucent paper parallel to the first axis and a second border line on the translucent paper parallel to the first border line;
   a first lined pattern on the translucent paper aligned generally parallel with the first axis and positioned between the first border line and the second border line; and
   a second lined pattern on the translucent paper aligned generally parallel with the first axis and positioned at least partially between the first border line and the first edge of the translucent paper nearest the first border line wherein the second lined pattern matches at least a portion of the first lined pattern;
   aligning at least a portion of the third lined pattern of the first row template with the first lined pattern of the third row template; and
   attaching the third row template to the first row template and fabric.

4. The method of applying a tear away quilting template to a fabric of claim 3 further comprising the steps of:
   attaching the third row template to the first row template and the fabric with an adhesive.

5. A method of applying a tear away quilting template to a fabric comprising the steps of:
   positioning a first row template on the fabric;
   attaching the first row template to the fabric;
   overlapping a second row template over the first row template wherein each first and second row template comprise:
   a generally rectangular translucent paper having a first edge, a second edge opposing the first edge, a third edge, a fourth edge opposing the third edge, a first axis parallel with the first edge and the second edge, a second axis perpendicular to the first edge and parallel to the third edge and fourth edge, a first border line parallel to the first axis, and a second border line parallel to the first border line;

a first lined pattern on the translucent paper positioned between the first border line and the second border line;

a second lined pattern on the translucent paper aligned with the first axis and positioned at least partially between the first border line and the first edge of the translucent paper nearest the first border line wherein the second lined pattern matches at least a portion of the first lined pattern; and wherein the first lined pattern further comprises a first portion positioned nearest the third edge and a second portion positioned nearest the fourth edge wherein the first portion matches with at least a portion of the second portion;

aligning the first portion of the first lined patterns of the first row template with the second portion of the first lined pattern of the second row template;

attaching the second row template to the first row template and fabric.

6. The method of applying a tear away quilting template to a fabric of claim 5 further comprising the steps of:
A attaching the first row template to the fabric with adhesive; and
attaching the second row template to the first row template and the fabric with adhesive.

7. The method of applying a tear away quilting template to a fabric of claim 6 further comprising the steps of:
attaching the corner template to the fabric with adhesive;
attaching the row template to the corner template and fabric with adhesive.

8. A method of applying a tear away quilting template to a fabric comprising the steps of:
positioning a first row template and a corner template on the fabric;
a second lined pattern on the translucent paper positioned between the "L" shaped first border line and the "L" shaped second border line and generally between the first lined pattern and the first edge of the second translucent paper wherein the second lined pattern matches at least a portion of the first lined pattern of the first row template;
wherein the distance between the first border line and a second border line of the first row template is equal to the distance between the first leg of the "L" shaped first border line of the corner template and the first leg of the "L" shaped second border line of the corner template;
attaching the corner template to the fabric;
wherein the first row template comprises:
a second lined pattern on the translucent paper aligned generally parallel with the first axis and positioned, at least partially, between the first border line and the first edge of the translucent paper nearest the first border line wherein the second lined pattern matches at least a portion of the first lined pattern;
wherein the corner template comprises:
a generally rectangular translucent paper having a first edge, a second edge opposing the first edge, a third edge, a fourth edge opposing the third edge, a first axis parallel with the first edge and the second edge, and a second axis perpendicular to the first edge and parallel to the third edge and fourth edge;
an "L" shaped first border line on the translucent paper having a first leg aligned with the first axis and a second leg aligned with the second axis and an "L" shaped second border line on the second translucent paper having a first leg aligned parallel with the first axis and a second leg aligned parallel with the second axis wherein the distance between the first leg of the "L" shaped first border line and the first leg of the "L" shaped second border line is equal to the distance between the second leg of the "L" shaped first border line and the second leg of the "L" shaped second border line;

a first lined pattern on the translucent paper positioned between the "L" shaped first border line and the "L" shaped second border line; and a generally rectangular translucent paper having a first edge, a second edge opposing the first edge, a third edge, a fourth edge opposing the third edge, a first axis parallel with the first edge and the second edge, and a second axis perpendicular to the first edge and parallel to the third edge and fourth edge;

a first border line on the translucent paper parallel to the first axis and a second border line on the translucent paper parallel to the first border line;

a first lined pattern on the translucent paper aligned generally parallel with the first axis and positioned between the first border line and the second border line; and overlapping the first row template over the corner template aligning at least a portion of the first lined pattern of the first row template with the second lined pattern of the corner template; and attaching the row template to the corner template and fabric.

9. The method of applying a tear away quilting template to a fabric of claim 8 further comprising the steps of;
aligning the first border line of the row template with the second leg of the "L" shaped second border line of the corner template; and
aligning the second border line of the row template with the second leg of the "L" shaped first border line of the corner template.

10. The method of applying a tear away quilting template to a fabric of claim 8 further comprising:
overlapping a second row template over the corner template;
wherein the second row template comprises:
a generally rectangular translucent paper having a first edge, a second edge opposing the first edge, a third edge, a fourth edge opposing the third edge, a first axis parallel with the first edge and the second edge, and a second axis perpendicular to the first edge and parallel to the third edge and fourth edge;
a first border line on the translucent paper parallel to the first axis and a second border line on the translucent paper parallel to the first border line;
a first lined pattern on the translucent paper positioned between the first border line and the second border line; and
a second lined pattern on the translucent paper generally aligned with the first axis and positioned, at least partially, between the first border line and the first edge of the translucent paper nearest the first border line wherein the second lined pattern matches at least a portion of the first lined pattern;
wherein said corner template further comprises a third lined pattern on the translucent paper positioned between the "L" shaped first border line and the "L" shaped second border line and generally between the first lined pattern and the third edge of the translucent paper and wherein the third lined pattern matches at least a portion of the first lined pattern of the second row template;

aligning at least a portion of the first lined pattern of the second row template with the third lined pattern of the corner template;

attaching the row template to the corner template and fabric.

11. The method of applying a tear away quilting template to a fabric of claim 10 further comprising of the steps of:

aligning the first border line of the second row template with the first leg of the "L" shaped first border line of the corner template; and aligning the second border line of the second row template with the first leg of the "L" shaped second border line.

\* \* \* \* \*